UNITED STATES PATENT OFFICE.

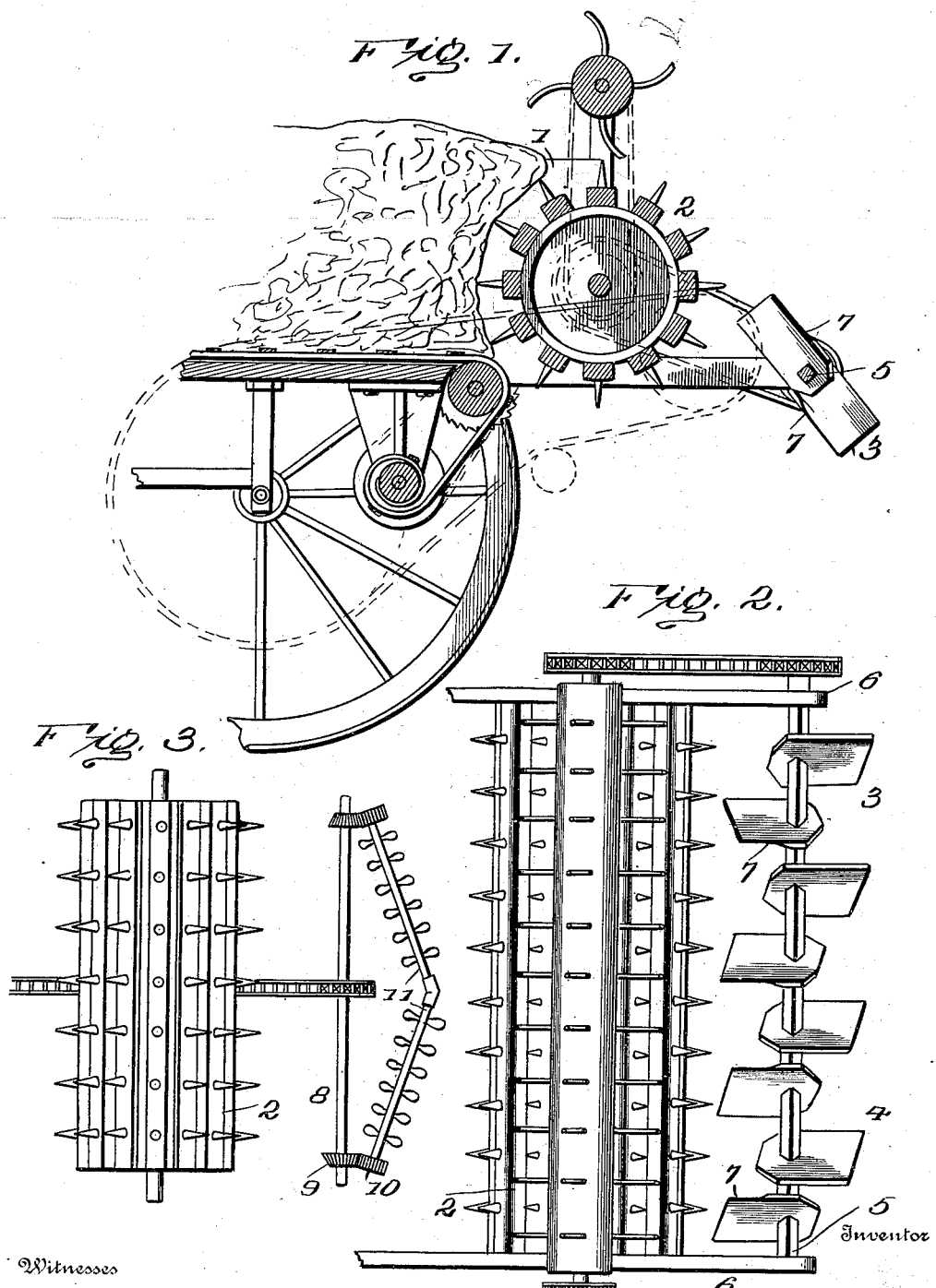

JOSEPH OPPENHEIM, OF MARIA STEIN, OHIO.

MANURE DISTRIBUTER AND SPREADER.

SPECIFICATION forming part of Letters Patent No. 648,519, dated May 1, 1900.

Application filed February 17, 1900. Serial No. 5,641. (No model.)

*To all whom it may concern:*

Be it known that I, JOSEPH OPPENHEIM, a citizen of the United States, residing at Maria Stein, in the county of Mercer and State of Ohio, have invented certain new and useful Improvements in Manure Distributers and Spreaders; and I do hereby declare the following to be a full, clear, and exact description of the invention, such as will enable others skilled in the art to which it appertains to make and use the same.

In the class of machines for distributing fertilizer of the character of manure or compost the ground is enriched to the extent only of the width of the wagon-body or other device containing the fertilizer or to a distance corresponding to the extent of the distributing mechanism. This necessitates the crossing and recrossing of the field a number of times or the provision of a machine of great width.

This invention has for its primary object to scatter the fertilizer and cover a tract of ground at one crossing of greater width than the relative transverse extent of the distributing mechanism. Hence the machine may be of comparatively-narrow track, which is of material advantage in weight, cost, storage, draft, and time required to fertilize a given field.

The invention consists in combining with a manure or compost distributer a spreader for throwing the fertilizer laterally and securing an even distribution of the manure over the track so covered.

The invention also consists of a rotary spreader having paddles inclined to the direction of motion of the machine, the paddles at one end inclining in an opposite direction to the paddles at the opposite end and the spreader consisting of one or more sections.

The invention further consists of the novel features, details of construction, and combination of the parts, which will be hereinafter more fully disclosed and finally claimed, and for this purpose and also to acquire a knowledge of the merits of the invention and the structural details of the means whereby the results are attained reference is to be had to the appended description and the drawings hereto attached.

While the essential and characteristic features of the invention are necessarily susceptible of modification, still the preferred embodiment of the invention is illustrated in the accompanying drawings, in which—

Figure 1 is a longitudinal section of a manure-distributer, showing the spreader in position. Fig. 2 is a top plan view thereof. Fig. 3 is a view similar to Fig. 2 of a modification.

Corresponding and like parts are referred to in the following description and indicated in all the views of the drawings by the same reference characters.

The machine may be of any construction generally utilized for distributing compost, manure, or like fertilizer, and comprises a body or receptacle 1 for receiving the fertilizer, a distributer 2, actuated from a ground-wheel, and means (not shown) for advancing the fertilizer to the distributer. The distributer 2 is a cylinder or drum comprising slats provided with teeth, which latter engage with the fertilizer and carry it from the receptacle 1 and deliver it at the rear of the machine.

The foregoing parts are well known and are shown to illustrate the application of the present invention, which consists, essentially, in the spreader or means for throwing the fertilizer laterally in each direction, whereby the space covered by the fertilizer is much greater than ordinary.

The spreader is mounted for rotation and is located in the rear of the distributer 2 and in a slightly-lower plane, so as to receive the fertilizer and spread the same laterally. The essential feature of the spreader is two sets of paddles 3 and 4, oppositely inclined, so as to throw the fertilizer to the right and to the left, the set of paddles 3 starting from a middle point of the machine and inclining toward the right, and the set of paddles 4 beginning at the middle and inclining toward the left. As shown in Figs. 1 and 2, the paddles are mounted upon a single shaft 5, which is journaled at its ends in rearwardly-extending bars 6, said shaft being connected with a moving part of the machine, so as to rotate at a higher rate of speed than the distributer and in the same direction, the paddles catching the fertilizer as it is discharged from the distributer 2 and increasing the width thereof by moving the particles laterally in opposite directions. When the paddles are secured to a single shaft, as 5, it is arranged parallel with the axis of the distributer 2, and the paddles are inclined with reference to the plane of motion of the shaft. The forward edges of the paddles are beveled, as shown at 7, whereby a knife-edge is provided to come in contact with the fertilizer and insure a lateral movement thereof.

The spreader may be constructed in sections, as shown in Fig. 3, which are oppositely inclined and are mounted for simultaneous rotation in opposite directions. In the form shown in Fig. 3 the paddles may be disposed in a plane at a right angle to the axial line of rotation of the shaft, since the inclination of the latter gives the proper set to the paddles. The shaft 8 is located slightly in the rear of the axis of the distributer 2 and is connected with a moving part of the machine, so as to be rotated, and has beveled pinions 9 at its ends, intermeshing with corresponding beveled pinions 10 at the ends of the oppositely-inclined shafts 11. The purpose of inclining the shaft 11 is to give the paddles the proper inclination to throw the fertilizer beyond the track of the machine.

In either form of construction the spreader is rotated at a higher rate of speed than the distributer, so as to evenly and uniformly spread the fertilizer and scatter it broadcast to a greater extent than the track or width of the machine and the ordinary distributing mechanism. The paddles may be of wood, metal, or any material suitable for the purpose and may be of any length and width and spaced the desired distance apart as may be found to give the best results after experiment. Any suitable and convenient means may be employed for transmitting rotary movement to the spreader from a positively-driven part of the machine, the connections shown being ordinary and illustrating different ways of attaining the same end.

Having thus described the invention, what is claimed as new is—

1. In a machine for distributing manure, compost and like fertilizer, and in combination with the distributing mechanism, a spreader mounted for rotation and comprising paddles, the paddles at one end being inclined in an opposite direction to the paddles at the opposite end with reference to the line of motion of the machine so as to throw the fertilizer laterally in opposite directions beyond the track of the machine, substantially as set forth.

2. In a fertilizer-distributer of the character set forth, a rotary spreader comprising sets of paddles oppositely inclined and having their forward edges beveled to a knife-edge, and means for rotating the spreader, substantially as set forth.

3. In a fertilizer-distributer of the character described, means for spreading the fertilizer material, the same consisting of oppositely-inclined shafts provided with paddles, and means for rotating said shafts in opposite directions, substantially as set forth.

4. In a fertilizer-distributer and in combination with the distributing mechanism, a shaft connected with the moving part of the machine to have rotary motion imparted thereto, oppositely-inclined shafts geared to the first-mentioned shaft and driven therefrom in opposite directions, and paddles applied to the inclined shafts, as and for the purpose set forth.

In testimony whereof I affix my signature in presence of two witnesses.

JOSEPH OPPENHEIM. [L. S.]

Witnesses:
FRANK WESTGERDES,
ROSALIA WESTGERDES.